United States Patent
Dahlman et al.

(10) Patent No.: US 8,998,501 B2
(45) Date of Patent: Apr. 7, 2015

(54) BEARING COMPONENT FOR A ROLLING BEARING OR FOR A SLIDING BEARING

(75) Inventors: Patrik Dahlman, Partille (SE); Martin Friis, Göteborg (SE)

(73) Assignee: Aktiebolaget SKF, Gothenburg (SE)

( * ) Notice: Subject to any disclaimer, the term of this patent is extended or adjusted under 35 U.S.C. 154(b) by 720 days.

(21) Appl. No.: 12/451,715

(22) PCT Filed: May 26, 2008

(86) PCT No.: PCT/SE2008/000353
§ 371 (c)(1),
(2), (4) Date: Apr. 15, 2010

(87) PCT Pub. No.: WO2008/147284
PCT Pub. Date: Dec. 4, 2008

(65) Prior Publication Data
US 2010/0215296 A1    Aug. 26, 2010

(30) Foreign Application Priority Data
Jun. 1, 2007 (SE) ...................... 0701358

(51) Int. Cl.
*F16C 33/32* (2006.01)
*B22D 19/16* (2006.01)
(Continued)

(52) U.S. Cl.
CPC ............ *B22D 19/16* (2013.01); *F16C 33/64* (2013.01); *F16C 33/60* (2013.01); *F16C 23/045* (2013.01); *F16C 33/122* (2013.01); *F16C 33/14* (2013.01); *F16C 33/36* (2013.01); *B22D 17/007* (2013.01);
(Continued)

(58) Field of Classification Search
CPC ........ F16C 33/64; F16C 33/60; F16C 33/122; B22D 17/007; B22D 19/16; B23P 15/003
USPC ......... 384/276, 277, 476, 492, 565, 569, 907, 384/907.1, 912, 913; 29/527.3, 527.5, 29/898.12; 148/906; 164/113, 900; 228/115, 193, 194, 195, 234.1, 235.1
See application file for complete search history.

(56) References Cited

U.S. PATENT DOCUMENTS 2,586,099 A * 2/1952 Schultz .................... 428/645
4,055,227 A * 10/1977 Brackett ................... 177/208
(Continued)

FOREIGN PATENT DOCUMENTS

| DE | 102009031625 A1 | 1/2001 |
| JP | 2002209483 | 7/2002 |
| JP | 2006322512 A | 11/2006 |

OTHER PUBLICATIONS

Professor Pradip Dutta entitled "A Brief Write-up About Semi-Solid Manufacturing (SSM) Technology in India", 2011.
(Continued)

*Primary Examiner* — Thomas R Hannon
*Assistant Examiner* — Adam D Rogers
(74) *Attorney, Agent, or Firm* — Bryan Peckjian; SKF USA Inc. Patent Dept.

(57) ABSTRACT

The invention concerns a bearing component (Ia, Ib, 1, 7, 9) for a rolling (13, 14, 16) or sliding bearing (19), wherein the bearing component (Ia, Ib, 1, 7, 9) is one of an inner ring (Ia, 1), an outer ring (Ib, 7), a rolling element (9), a cage, or a guide ring. The bearing component (Ia, Ib, 1, 7, 9) comprises a first material (2), and a second material (3) joined to the first material (2), wherein the second material (3) and the first material (2) having been joined by a semi-solid metal process.

14 Claims, 4 Drawing Sheets

(51) Int. Cl.

| | | |
|---|---|---|
| *F16C 33/64* | (2006.01) | |
| *F16C 33/60* | (2006.01) | |
| *F16C 23/04* | (2006.01) | |
| *F16C 33/12* | (2006.01) | |
| *F16C 33/14* | (2006.01) | |
| *F16C 33/36* | (2006.01) | |
| *B22D 17/00* | (2006.01) | |
| *B23P 15/00* | (2006.01) | |

(52) U.S. Cl.
CPC ............ *B23P 15/003* (2013.01); *Y10S 384/907* (2013.01); *Y10S 164/90* (2013.01)

(56) References Cited

U.S. PATENT DOCUMENTS

| | | | |
|---|---|---|---|
| 5,701,942 A * | 12/1997 | Adachi et al. | 164/71.1 |
| 5,716,147 A * | 2/1998 | Cook et al. | 384/492 |
| 5,849,115 A * | 12/1998 | Shiina et al. | 148/549 |
| 6,079,477 A * | 6/2000 | Woodhouse | 164/76.1 |
| 6,311,759 B1 * | 11/2001 | Tausig et al. | 164/113 |
| 6,485,188 B1 * | 11/2002 | Dougherty | 384/589 |
| 6,579,012 B2 | 6/2003 | Brandenstein et al. | |
| 6,746,154 B2 * | 6/2004 | Greene et al. | 384/276 |
| 6,764,219 B2 * | 7/2004 | Doll et al. | 384/565 |
| 6,769,473 B1 * | 8/2004 | Adachi et al. | 164/71.1 |
| 7,140,419 B2 * | 11/2006 | Doutre et al. | 164/113 |
| 7,165,890 B2 * | 1/2007 | Smith | 384/206 |
| 7,503,697 B2 * | 3/2009 | Tsuji et al. | 384/476 |
| 2006/0021728 A1 * | 2/2006 | Gadow et al. | 164/80 |
| 2011/0235957 A1 * | 9/2011 | Vissers et al. | 384/523 |
| 2011/0255819 A1 * | 10/2011 | Vissers et al. | 384/564 |
| 2012/0055587 A1 * | 3/2012 | Vissers et al. | 148/516 |

OTHER PUBLICATIONS

P. Kapranos, D.H. Kirkwood, and C.M. Sellars entitled "Semi-Solid Processing of Tool Steel" vol. 3, Nov. 1993.

M.S. Salleh, M.Z. Omar, J. Syarif, and M.N. Mohammed entitled "An Overview of Semisolid Processing of Aluminum Alloys", vol. 2013.

Shankargoud Nyamannavar, M. Ravi & K. Narayan Prabhu: "Effect of Isothermal Holding at Semi-Solid Temperature and Presence of 1% Fe on Microstructure of Al-7Si-0.3Mg Alloy", vol. 1, No. 1, Jun. 2005.

* cited by examiner

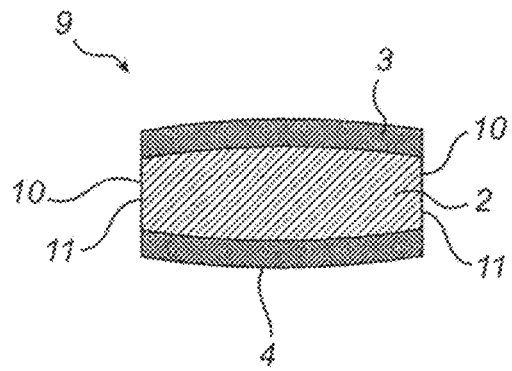
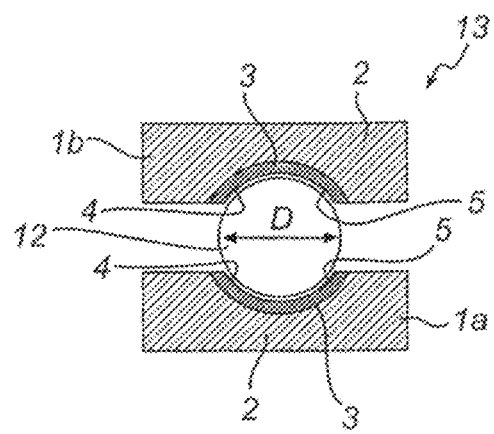
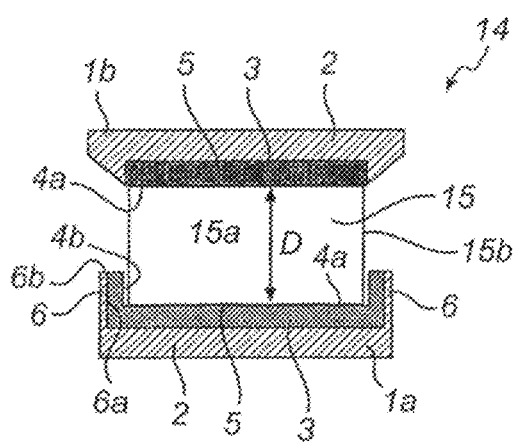
Fig. 5　　Fig. 6
Fig. 7

BEARING COMPONENT FOR A ROLLING BEARING OR FOR A SLIDING BEARING

CROSS REFERENCE TO RELATED APPLICATIONS

This is a National Stage application claiming the benefit of International Application Number PCT/SE2008/000353 filed on 26 May 2008, which claims the benefit of Sweden Patent Application 0701358-4 filed on 1 Jun. 2007, both of which are incorporated herein by reference in their entireties.

FIELD OF THE INVENTION

According to a first aspect, the invention concerns a bearing component for a rolling bearing or a sliding bearing.

According to a second aspect, the invention concerns a rolling bearing.

According to a third aspect, the invention concerns a sliding bearing.

BACKGROUND OF THE INVENTION

The demand for higher bearing performance, lower manufacturing cost and material cost is constantly increasing. Bearing materials exhibiting good performance properties, e.g. durability, strength, load bearing capacity, wear resistance, low weight, may often be rather expensive or difficult to use efficiently in near net shape forming. On the other hand, cheaper bearing materials may not fulfill high performance demands of bearings.

SUMMARY OF THE INVENTION

An object of the invention is to provide a bearing component that may exhibit one or more specific performance properties, while still having a low cost and being relatively easy to manufacture.

According to the first aspect of the invention, the object is achieved by a bearing component for a rolling or sliding bearing, where the bearing component is any of an inner ring, an outer ring, a rolling element, a cage or retainer, or a guide ring. The bearing component comprises a first material and a second material that is joined to the first material. The second material and the first material have been joined by a semi-solid metal process, i.e. the first material has been heated to a temperature between its equilibrium liquidus and equilibrium solidus temperatures and is allowed to assume a solid state in presence of the second material and thus accomplishing a fixing between the second material and the first material. The second material is having a contact surface that allows a relative movement between the contact surface and a second bearing component.

A semi-solid metal process (SSM) refers to a process for forming a metal alloy at a temperature between its equilibrium liquidus and equilibrium solidus temperatures. SSM combines the fundamentals and advantages of casting, forging and extrusion. Furthermore, SSM processes produce components with low porosity, high crack resistance, few defects, fine and more homogeneous microstructures, improved mechanical properties etc. Other advantages may be facilitated forming of complex components, material savings due to less waste, and cost reductions. Furthermore, SSM allows integration of different materials that facilitates tailored product solutions.

In an embodiment, the first material is the one which is heated to a temperature between its equilibrium liquidus and equilibrium solidus temperatures.

In an embodiment, the semi-solid metal process is a thixoforming process, a thixocasting process, a thixoforging process, a thixojoining process, a rheoforming process, a rheocasting process, a rheoforging process, or a rheojoining process.

In an embodiment, the first material is a light weight material, which reduces the weight of the bearing component. In an embodiment, the first material is a light metal material, which reduces the weight of the bearing component. In an embodiment, the first material is aluminium, or an aluminium alloy, which reduces the weight of the bearing component. In an embodiment, the first material is titanium, or a titanium alloy, which reduces the weight of the bearing component.

In an embodiment, the first material is a shock absorbing material, a resilient material, or a dampening material. This reduces unwanted vibrations or noise in a bearing or an application or device in connection to a bearing or bearing component.

In an embodiment, the first material is cast iron, which has a dampening function of the bearing component.

In an embodiment, the first material is a low carbon steel, which lowers the cost of the bearing component.

In an embodiment, the first material is an electrically insulating material. In some applications it is wanted to protect a bearing or bearing component itself from electric currents or electric shocks. In some applications it is wanted to protect other components or devices, in connection to a bearing or bearing component, from electrical currents or electrical shocks.

In an embodiment, the first material is a thermally insulating material. In some applications it is desired to protect a bearing or bearing component itself from heat or cold. In some applications it is wanted to protect other components or devices, in connection to a bearing or bearing component, from heat or cold.

In an embodiment, the second material is steel, for instance a bearing steel or a stainless steel. Advantages of using steel are good wear resistance, good rolling or sliding properties, high durability, good fatigue, high speeds and other possible high performance properties.

In an embodiment, the second material is a hard metal, which gives the bearing component a high wear resistance.

In an embodiment, the second material is cemented carbide, which gives the bearing component a high wear resistance.

In an embodiment, the second material is a carbide metal, which gives the bearing component a high wear resistance.

In an embodiment, the second material is a ceramic material, which gives the bearing component a high wear resistance. Other advantages are electrical or thermal insulation or resistance, low weight etc.

In an embodiment, the second material is bronze, which gives the bearing component good sliding properties, low friction and low cost.

In an embodiment, the second material is brass, which gives the bearing component good sliding properties, low friction and low cost.

In an embodiment, the second material is an electrically insulating material. In some applications it is wanted to protect a bearing or bearing component itself from electric currents or electric shocks. In some applications it is wanted to protect other components or devices, in connection to a bearing or bearing component, from electrical currents or electrical shocks.

In an embodiment, the second material is a thermally insulating material. In some applications it is wanted to protect a bearing or bearing component itself from heat or cold. In some applications it is wanted to protect other components or devices, in connection to a bearing or bearing component, from heat or cold.

By selecting different first materials and second materials, different properties of the bearing component or bearing may be achieved. For instance, by using a light weight material as the first material, and bearing steel as the second material, the bearing component or bearing will have a reduced weight while still having good performance properties such as load carrying capacity, long service life etc.

In an embodiment, the second material is having a contact surface allowing a relative movement between the contact surface and a second bearing component.

In an embodiment, the bearing component is a ring, and the second material is having a contact surface. The contact surface may constitute a raceway, a sliding surface, at least a part of a guide, flange or similar of the inner ring.

In an embodiment, the ring is one of an inner ring or an outer ring.

In an embodiment, the bearing component is a rolling element, e.g. a roller. The roller may be a cylindrical roller, a barrel-shaped roller, a spherical roller, a toroidal roller, a needle roller, a tapered roller, a conical roller, or in any other form. In an embodiment, the second material has a contact surface at least covering areas of the rolling element that may come in contact with other bearing components via a relative movement. Other bearing components may be an inner or outer bearing ring, a guide flange or similar of an inner or outer bearing ring, a rolling element, a cage, or a guide ring.

According to the second aspect of the invention, a rolling bearing is disclosed. It comprises at least an inner ring, an outer ring, and a plurality of rolling elements, and further comprising the bearing component according to the first aspect of the invention. All features and embodiments of the first aspect of the invention are applicable to the second aspect of the invention and vice versa.

In an embodiment according to this aspect, the contact surface is a raceway.

In an embodiment, the rolling bearing comprising the bearing component is having balls as rolling elements.

In an embodiment, the second material of the bearing component is having a thickness of at least 5 percent of a diameter of the balls.

In an embodiment, the second material of the bearing component is having a thickness of at least 10, 15, 20, 25, 30, 35, 40, 45, 50, 55, 60, 70, 80, 90, or 95 percent of a diameter of the balls.

In an embodiment, the rolling bearing comprising the bearing component is having rollers as rolling elements.

In an embodiment, the second material is having a thickness of at least 5 percent of a diameter of the rollers.

In an embodiment, the second material of the bearing component is having a thickness of at least 10, 15, 20, 25, 30, 35, 40, 45, 50, 55, 60, 70, 80, 90, or 95 percent of a diameter of the rollers.

In an embodiment, the rolling bearing comprising the bearing component is any of a ball bearing, a cylindrical roller bearing, a spherical roller bearing, a toroidal roller bearing, a taper roller bearing, a conical roller bearing, a needle roller bearing, a thrust bearing, a wheel bearing, a wheel hub bearing, a pinion bearing, or a flanged bearing.

According to the third aspect of the invention, a sliding bearing is disclosed. It comprises the bearing component according to the first aspect of the invention. All features and embodiments of the first aspect of the invention are applicable to all features and embodiments of the third aspect of the invention and vice versa. Features and embodiments of the second aspect are, based on the person skilled in the art, applicable to the third aspect and vice versa.

In an embodiment according to this aspect, the contact surface is a sliding surface.

In an embodiment, the sliding bearing comprises the bearing component, and the second material is having a thickness of at least 1 millimeter.

In an embodiment, the second material of the bearing component is having a thickness of at least 2, 3, 4, 5, 6, 7, 8, 9, 10, 15, 20, 30, 40, 50, 60, 70, 80, 90, 100, 110, 120, 130, 140, 150, 160, 170, 180, 190, or 200 millimeter.

BRIEF DESCRIPTION OF THE DRAWINGS

FIG. 5: A cross-section of a spherical roller according to an embodiment of the invention.

FIG. 6: A cross-section of a ball bearing according to an embodiment of the invention.

FIG. 7: A cross-section of a cylindrical roller bearing according to an embodiment of the invention.

DETAILED DESCRIPTION OF THE INVENTION

Figure 1A:
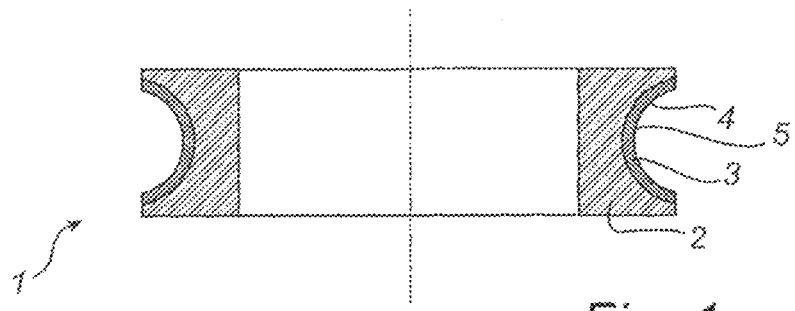
FIG. 1a: A cross-section of an inner bearing ring according to an embodiment of the invention.

In FIG. 1a, a cross-section of an inner bearing ring according to an embodiment of the invention is shown. The inner ring 1 comprises a first material 2 and a second material 3. The second material 3 is joined to the first material 2. The second material 3 and the first material 2 have been joined by a semi-solid metal process, as described above, wherein the first material 2 and the second material 3 have a molecular grain structure formed between the first material and the second material, wherein the molecular grain structure is a result of and associated uniquely with the semi-solid metal process. The second material 3 is having a contact surface 4 that allows a relative movement between the contact surface 4 and a second bearing component (not shown). The contact surface 4 corresponds at least to a raceway 5 of the inner ring. In an embodiment, the second bearing component may be an outer ring, a rolling element, a cage or a guide ring. The contact surface 4 of the second material 3 may also extend outside the raceway 5 and cover other parts of the inner ring 1, such as a guide flange or an outer periphery of the inner ring.

Figure 1B:
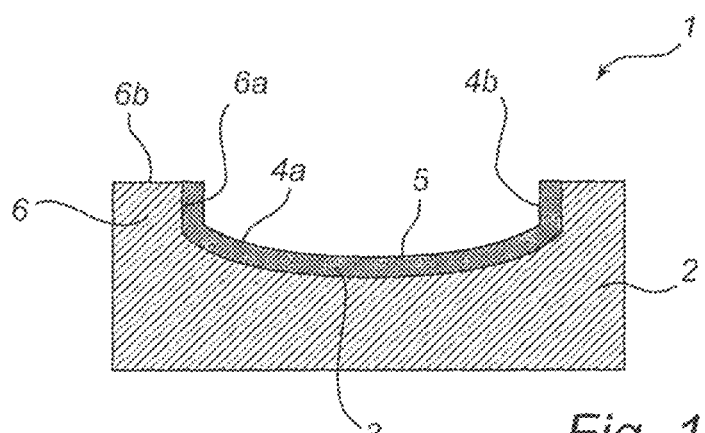
FIG. 1b: A portion of an inner bearing ring shown in cross-section according to an embodiment the invention.

In FIG. 1b, a part of an inner bearing ring according to an embodiment of the invention is shown in cross-section. The inner ring 1 comprises a first material 2 and a second material 3. The second material 3 is joined to the first material 2. The second material 3 and the first material 2 have been joined by a semi-solid metal process, as described above.

The second material 3 is having a contact surface 4a, 4b that allows a relative movement between the contact surface 4a, 4b and a second bearing component (not shown). The contact surface 4a corresponds at least to a raceway 5 of the inner ring. In an embodiment, the second bearing component may be an outer ring, a rolling element, a cage or a guide ring. In an embodiment, the inner ring 1 is having a flange 6 at each axial end of the inner ring 1. The flange 6 further presents an axially inner end face 6a, and a radially outer end face 6b. The second material 3 is having a second contact surface 4b that essentially corresponds to the axially inner end face 6a of the guide flange, and further allows a relative movement between the contact surface 4b and a second bearing component (not shown). The second material 3 may also have a third contact surface corresponding to the outer radial surface 6b of the flange 6.

Figure 2:
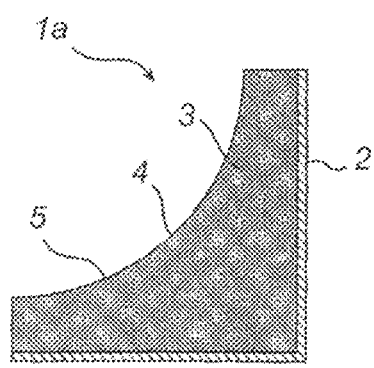
FIG. 2: A part of an inner bearing ring shown in cross-section according to an embodiment of the invention.

In FIG. 2, a part of an inner bearing ring according to the invention is shown in cross-section. The part of the inner ring 1a comprises a first material 2 and a second material 3. The second material 3 is joined to the first material 2. The second material 3 and the first material 2 have been joined by a semi-solid metal process, as described above, wherein the first material 2 and the second material 3 have a molecular grain structure formed between the first material and the second material, wherein the molecular grain structure is a result of and associated uniquely with the semi-solid metal process.

In an embodiment, the first material 2 is an electrically insulating material, and the second material 3 is bearing steel. A part of a raceway 5 is formed in the second material 3 on an outer periphery of the inner ring 1a. The raceway 5 presents a contact surface 4 that allows a relative movement between the contact surface 4 and a second bearing component (not shown). In an embodiment, the second bearing component may be an outer ring, a rolling element, a cage or a guide ring.

Figure 3:
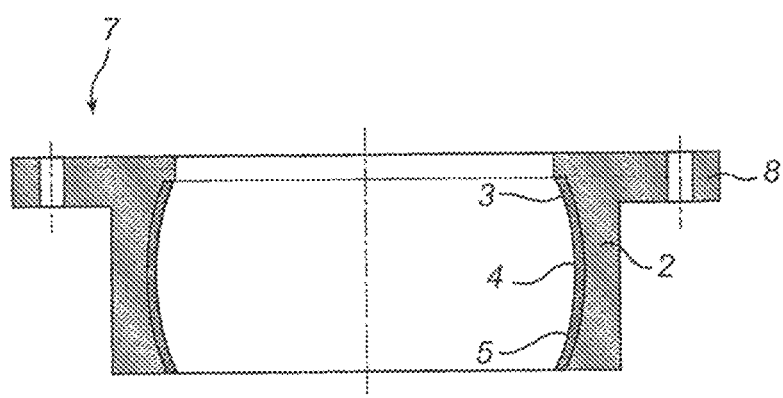
FIG. 3: A cross-section of a flanged outer bearing ring according to an embodiment of the invention.

In FIG. 3, a cross-section of a flanged outer bearing ring according to an embodiment of the invention is shown. The outer ring 7 is having a flange 8, which may for instance be used for fixing the outer ring 7 to a mechanical element, housing or the like (not shown). The outer ring 7 comprises a first material 2 and a second material 3. The second material 3 is joined to the first material 2. The second material 3 and the first material 2 have been joined by a semi-solid metal process, as described above, wherein the first material 2 and the second material 3 have a molecular grain structure formed between the first material and the second material, wherein the molecular grain structure is a result of and associated uniquely with the semi-solid metal process.

The second material 3 is having a contact surface 4 that allows a relative movement between the contact surface 4 and a second bearing component (not shown). The contact surface 4 corresponds at least to a raceway 5 on an inner periphery of the outer ring 7. In an embodiment, the second bearing component may be an inner ring, a rolling element, a cage or a guide ring. The contact surface 4 of the second material 3 may also extend outside the raceway 5 and also cover other parts of the outer ring 7, such as a guide flange or an outer periphery of the outer ring 7.

Figure 4:
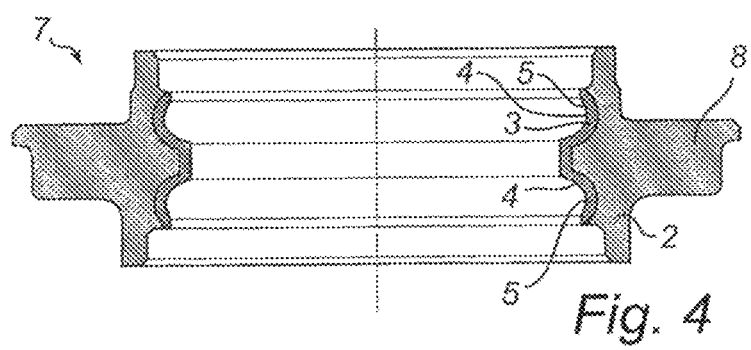
FIG. 4: A cross-section of a wheel hub outer ring according to an embodiment the invention.

In FIG. 4, a cross-section of a wheel hub outer ring according to an embodiment of the invention is shown. The outer ring 7 is having a flange 8, which may for instance be used for fixing the outer ring 7 to a car-side fitting, or for mounting a wheel. The outer ring 7 comprises a first material 2 and a second material 3. The second material 3 is joined to the first material 2. The second material 3 and the first material 2 have been joined by a semi-solid metal process, as described above, wherein the first material 2 and the second material 3 have a molecular grain structure formed between the first material and the second material, wherein the molecular grain structure is a result of and associated uniquely with the semi-solid metal process.

The second material 3 is having a contact surface 4 that allows a relative movement between the contact surface 4 and a second bearing component (not shown). The contact surface 4 corresponds at least to a raceway 5 on an inner periphery of the outer ring 7. In an embodiment, the outer ring 7 is having two raceways and the second bearing component may be a rolling element, a cage or a guide ring. The contact surface 4 of the second material 3 may also extend outside the raceway 5 and also cover other parts of the outer ring 7, such as a guide flange or an outer periphery of the outer ring 7.

In FIG. 5, a cross-section of a spherical roller according to an embodiment of the invention is shown. The spherical roller 9 comprises a first material 2 and second material 3. The second material 3 is joined to the first material 2. The second material 3 and the first material 2 have been joined by a semi-solid metal process, as described above, wherein the first material 2 and the second material 3 have a molecular grain structure formed between the first material and the second material, wherein the molecular grain structure is a result of and associated uniquely with the semi-solid metal process. The second material 3 is having a contact surface 4 that allows a relative movement between the contact surface 4 and a second bearing component (not shown). In an embodiment, the second bearing component may be an inner ring, an outer ring, a cage, a rolling element, or a guide ring. In an embodiment, at least a part of the axial end faces 10 of the spherical roller 9 are presenting a surface 11 that comprises the first material 2.

In FIG. 6, a cross-section of a ball bearing according to an embodiment of the invention is shown. The ball bearing 13 comprises at least an inner ring 1a with a raceway 5 on its outer periphery, an outer ring 1b with a raceway 5 formed on its inner periphery, and a plurality of balls 12 located between the inner ring 1a and the outer ring 1b. The ball bearing may also comprise further bearing components such as a cage, a seal, a sensor, an encoder, lubricants etc.

In an embodiment, the ball bearing 13 is having two bearing components, 1a and 1b, according to the invention. Both of the inner ring 1a and the outer ring 1b comprise a first material 2 and second material 3. The second material 3 is joined to the first material 2. The second material 3 and the first material 2 have been joined by a semi-solid metal process, as described above, wherein the first material 2 and the second material 3 have a molecular grain structure formed between the first material and the second material, wherein the molecular grain structure is a result of and associated uniquely with the semi-solid metal process. The second material 3 is having a contact surface 4 that essentially corresponds to the raceway 5 on the inner ring 1a and the outer ring 1b and allows a relative movement between the contact surface 4 and the balls 12. The relative movement may e.g. be a rolling movement, a sliding movement, or a combination of both.

In an embodiment the thickness of the second material 3 is preferably at least 5 percent of a diameter D of the balls 12.

Even though the ball bearing in an embodiment is described to have two bearing components according to the invention, it is also possible to have a ball bearing where only one of the inner ring and the outer ring is a bearing component according to the invention. Furthermore, instead of the bearing component according to the invention being in the form of a bearing ring, the bearing component may be a cage or a guide ring. The ball bearing may also comprise a combination of different bearing components according to the invention.

It should be understood that the invention is not limited to the deep groove ball bearing as shown in FIG. 6, but is also applicable to other types of ball bearings. Non-limiting examples include angular contact ball bearings, self-aligning ball bearings, thrust ball bearings, four-point contact ball bearings.

In FIG. 7, a cross-section of a cylindrical roller bearing according to an embodiment of the invention is shown. The cylindrical roller bearing 14 comprises at least an inner ring 1a with a raceway 5 on its outer periphery, an outer ring 1b with a raceway 5 formed on its inner periphery, and a plurality of cylindrical rollers 15 located between the inner ring 1a and the outer ring 1b. The inner ring 1a presents a flange 6 at each axial end of the inner ring 1a. Each flange 6 presents an inner axial surface 6a facing an end face 15b of the cylindrical rollers 15, and an outer radial surface 6b. The cylindrical roller bearing may also comprise further bearing components such as a cage, a seal, a sensor, an encoder, lubricants etc.

In an embodiment, the cylindrical roller bearing 14 is having two bearing components, 1a and 1b, according to the invention. The outer ring 1b comprises a first material 2 and a second material 3. The second material 3 is joined to the first material 2. The second material 3 and the first material 2 have been joined by a semi-solid metal process, as described above, wherein the first material 2 and the second material 3 have a molecular grain structure formed between the first material and the second material, wherein the molecular grain structure is a result of and associated uniquely with the semi-solid metal process. The second material 3 is at least having a first contact surface 4a that essentially corresponds to the raceway 5 on the outer ring 1a and allows a relative movement between the contact surface 4a and the rollers 15. The relative movement may e.g. be a rolling movement, a sliding movement, or a combination of both.

The inner ring 1a comprises a first material 2 and second material 3. The second material 3 is joined to the first material 2. The second material 3 and the first material 2 have been joined by a semi-solid metal process, as described above, wherein the first material 2 and the second material 3 have a molecular grain structure formed between the first material and the second material, wherein the molecular grain structure is a result of and associated uniquely with the semi-solid metal process.

The second material 3 is at least having a first contact surface 4a that essentially corresponds to the raceway 5 on the inner ring 1a and allows a relative movement between the contact surface 4a and the rollers 15. The relative movement may e.g. be a rolling movement, a sliding movement, or a combination of both. The second material is further having a second contact surface 4b essentially corresponding to the inner axial surface 6a of the guide flange 6 and allows a relative movement between the contact surface 4b and the end face 15b of the cylindrical roller 15. The relative movement is in this case a sliding movement.

In an embodiment, the thickness of the second material 3 is preferably at least 5 percent of a diameter D of the rollers 15.

Even though the roller bearing in this embodiment is described to have two bearing components according to the invention, it is also possible to have a cylindrical roller bearing where only one of the inner ring and the outer ring is a bearing component according to the invention. Furthermore, instead of the bearing component according to the invention being in the form of a bearing ring, the bearing component may be a cage, a guide ring or a roller. The cylindrical roller bearing may also comprise a combination of different bearing components according to the invention.

It should be understood that the invention is not limited to cylindrical roller bearings as shown in FIG. 7, but is also applicable to other types of roller bearings. Non-limiting examples of these include spherical roller bearings, self-aligning roller bearings, taper roller bearings, conical roller bearings, needle roller bearings, toroidal roller bearings, spherical roller thrust bearings, cylindrical roller thrust bearings, taper roller thrust bearings.

Figure 8:
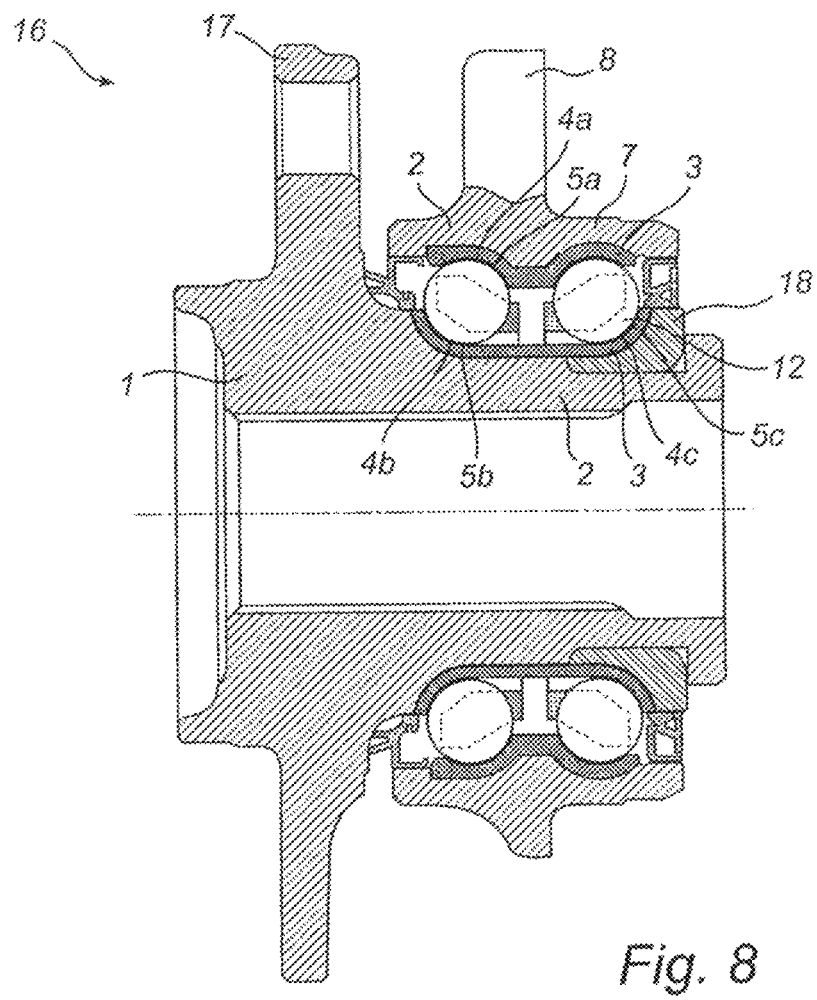
FIG. 8: A cross-section of a wheel hub according to an embodiment of the invention.

In FIG. 8, a cross-section of a wheel hub according to an embodiment of the invention is shown. The wheel hub 16 comprises an inner ring 1, an outer ring 7 and a plurality of rolling elements 12 interposed between the inner ring 1 and the outer ring 7. In this embodiment the rolling elements 12 are balls, but it may also be tapered rollers or cylindrical rollers. The wheel hub may also comprise further bearing components such as a cage, a seal, a sensor, an encoder, lubricants etc.

In an embodiment, the wheel hub 16 is having two bearing components, 1 and 7, according to the invention. The inner ring 1 is having a flange 17, which in this embodiment is intended for fitting a wheel to the wheel hub. The inner ring 1 further presents a first raceway 5b and a second raceway 5c on its outer periphery. In an embodiment the second raceway 5c is formed on a separate inner ring 18 that is press-fitted onto the wheel hub inner ring 1. The outer ring 7 is having a flange 8 formed on the outer periphery of the outer ring 7, which in this embodiment is intended for attaching the wheel hub to a car-side fitting, e.g. a knuckle. The outer ring 7 further presents a double row raceway 5a on its inner periphery, opposing the first and second raceway 5b and 5c on the inner ring 1.

The inner ring 1 and the outer ring 7 comprise a first material 2 and a second material 3. The second material 3 is joined to the first material 2. The second material 3 and the first material 2 have been joined by a semi-solid metal process, as described above, wherein the first material 2 and the second material 3 have a molecular grain structure formed between the first material and the second material, wherein the molecular grain structure is a result of and associated uniquely with the semi-solid metal process.

The second material 3 is having at least three contact surfaces 4a, 4b, 4c, on the inner ring 1 and the outer ring 7 that allow a relative movement between the contact surfaces 4a, 4b, 4c, and the balls 12. The contact surfaces 4a, 4b, 4c, correspond at least to the raceways 5a, 5b, 5c, on the inner ring 1 and the outer ring 7. The relative movement may e.g. be a rolling movement, a sliding movement, or a combination of both. The contact surfaces 4a, 4b, 4c, of the second material 3 may also extend outside the raceways 5a, 5b, 5c, and also cover other parts of the inner ring 1 and the outer ring 7.

In an embodiment, the thickness of the second material 3 is preferably at least 5 percent of the diameter of the balls 12.

Even though the wheel hub in this embodiment is described to have two bearing components according to the invention, it is also possible to have a wheel hub where only one of the inner ring and the outer ring is a bearing component according to the invention. Furthermore, instead of the bearing component according to the invention being in the form of a bearing ring, the bearing component may be a cage, a guide ring or a roller. The wheel hub may also comprise a combination of different bearing components according to the invention.

It should be understood that the invention is not limited to the wheel hub as shown in FIG. 8, but is also applicable to other wheel hub and wheel bearing designs.

Figure 9:
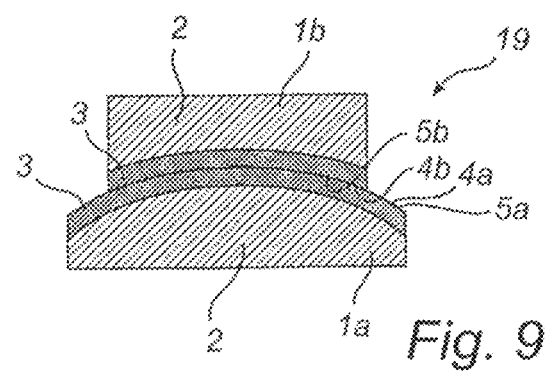
FIG. 9: A cross-section of a spherical sliding bearing according to an embodiment of the invention.

In FIG. 9, a cross-section of a spherical sliding bearing according to an embodiment of the invention is shown. The spherical sliding bearing 19 comprises at least an inner ring 1a with a raceway 5a on its outer periphery, and an outer ring 1b with a raceway 5b formed on its inner periphery. In an embodiment, the spherical sliding bearing 19 is having two bearing components, 1a and 1b, according to the invention. The inner ring 1a and the outer ring 1b comprise a first material 2 and a second material 3. The second material 3 is joined to the first material 2. The second material 3 and the first material 2 have been joined by a semi-solid metal process, as described above, wherein the first material 2 and the second material 3 have a molecular grain structure formed between the first material and the second material, wherein the molecular grain structure is a result of and associated uniquely with the semi-solid metal process.

The second material 3 is at least having two contact surfaces 4a, 4b, on the inner ring 1a and the outer ring 1b, which essentially correspond to the raceways 5a and 5b, and allow a relative movement between the contact surfaces 4a, 4b. The relative movement is in this embodiment a sliding movement.

In an embodiment, the thickness of the second material 3 is preferably at least 1 millimeter.

Even though the sliding bearing in this embodiment is described to have two bearing components according to the invention, it is also possible to have a sliding bearing where only one of the inner ring and the outer ring is a bearing component according to the invention.

It should be understood that the invention is not limited to the sliding bearing as shown in FIG. 9, but is also applicable to other types of sliding bearings, plain bearings or sleeve bearings, as understood by the person skilled in the art.

The invention claimed is:

1. A bearing component for a rolling bearing, the bearing component comprising: a body formed of a first material and a second material joined to the first material by a semi-solid metal process and configured as one of:
    an inner ring,
    an outer ring, and
    a rolling element,
    the body having a molecular grain structure formed between the first material and the second material, wherein the molecular grain structure is a result of and associated uniquely with the semi-solid metal process.

2. The bearing component according to claim 1, wherein the semi-solid metal process is one of:
    a thixoforming process,
    a thixocasting process,
    a thixoforging process,
    a thixojoining process,
    a rheoforming process,
    a rheocasting process,
    a rheoforging process, and
    a rheojoining process.

3. The bearing component according to claim 1, wherein the first material is at least one of:
    aluminum,
    titanium,
    cast iron,
    a low carbon steel,
    an electrically insulating material,
    a thermally insulating material,
    a shock absorbing material,
    a resilient material and
    a dampening material.

4. The bearing component according to claim 1, wherein the second material is at least one of:
    a steel,
    a bearing steel,
    a stainless steel,
    cemented carbide,
    a carbide metal,
    a ceramic material,
    brass,
    bronze, and
    an electrically insulating material, and a thermally insulating material.

5. The bearing component according to claim 1, wherein the bearing component is a one of the inner ring and the outer ring, and the second material has a contact surface.

6. The bearing component according to claim 1, wherein the bearing component is the rolling element.

7. A rolling bearing comprising: an inner ring, an outer ring, and a plurality of rolling elements, wherein at least one of the inner ring, the outer ring, and the plurality of rolling elements is formed of a first material and a second material joined to the first material by a semi-solid metal process,
    wherein the first material is a first metal and the second material is a second metal which is different from the first metal,
    the at least one of the inner ring, the outer ring, and the plurality of rolling elements having a molecular grain structure formed between the first material and the second material, wherein the molecular grain structure is a result of and associated uniquely with the semi-solid metal process.

8. The rolling bearing according to claim 7, wherein the rolling bearing is one of:
    a ball bearing,
    a cylindrical roller bearing,
    a spherical roller bearing,
    a toroidal roller bearing,
    a taper roller bearing,
    a conical roller bearing,
    a needle roller bearing,
    a thrust bearing,
    a wheel bearing,
    a pinion bearing, and
    a flanged bearing.

9. A sliding bearing comprising a bearing component formed of a first single material having a first material surface and a second layer of a second single material joined to a portion of the first material surface by a semi-solid metal process,
    wherein the first material differs from the second material and the bearing component is configured as one of an inner ring and an outer ring,
    the bearing component having a molecular grain structure formed between the first material and the second material, wherein the molecular grain structure is a result of and associated uniquely with the semi-solid metal process.

10. A bearing component for a sliding bearing, the bearing component comprising: a body formed of a first single material having a first material surface and a layer of a second single material joined to the first material surface by a semi-solid metal process,
    wherein the first material differs from the second material and the bearing component is configured as one of an inner ring and an outer ring,
    wherein the body having a molecular grain structure formed between the first material and the second material, wherein the molecular grain structure is a result of and associated uniquely with the semi-solid metal process.

11. The bearing component according to claim 10, wherein the semi-solid metal process is one of:
- a thixoforming process,
- a thixocasting process,
- a thixoforging process,
- a thixojoining process,
- a rheoforming process,
- a rheocasting process,
- a rheoforging process, and
- a rheojoining process.

12. The bearing component according to claim 10, wherein the first material is at least one of:
- aluminum,
- titanium,
- cast iron,
- a low carbon steel,
- an electrically insulating material,
- a thermally insulating material,
- a shock absorbing material,
- a resilient material and
- a dampening material.

13. The bearing component according to claim 10, wherein the second material is at least one of:
- a steel,
- a bearing steel,
- a stainless steel,
- cemented carbide,
- a carbide metal,
- a ceramic material,
- brass,
- bronze,
- an electrically insulating material, and
- a thermally insulating material.

14. The bearing component according to claim 10, wherein the second material has a contact surface.

* * * * *